United States Patent
Dousse et al.

(10) Patent No.: US 10,354,200 B2
(45) Date of Patent: Jul. 16, 2019

(54) METHOD, APPARATUS AND COMPUTER PROGRAM PRODUCT FOR COLLABORATIVE MOBILITY MAPPING

(71) Applicant: HERE Global BV, Eindhoven (NL)

(72) Inventors: Olivier Dousse, Veldhoven (NL); Arshak Grigoryan, Veldhoven (NL); Tom Phelan, Veldhoven (NL); Dmitry Skripin, Veldhoven (NL); Gavin Brown, Veldhoven (NL); Nam Tran Duc, Veldhoven (NL)

(73) Assignee: HERE Global B.V., Eindhoven (NL)

( * ) Notice: Subject to any disclaimer, the term of this patent is extended or adjusted under 35 U.S.C. 154(b) by 796 days.

(21) Appl. No.: 14/968,501

(22) Filed: Dec. 14, 2015

(65) Prior Publication Data
US 2017/0169356 A1    Jun. 15, 2017

(51) Int. Cl.
| | | |
|---|---|---|
| *G06N 20/00* | (2019.01) | |
| *H04W 8/24* | (2009.01) | |
| *G06Q 10/10* | (2012.01) | |
| *G06Q 50/00* | (2012.01) | |

(52) U.S. Cl.
CPC .............. *G06N 20/00* (2019.01); *G06Q 10/10* (2013.01); *G06Q 50/01* (2013.01); *H04W 8/245* (2013.01)

(58) Field of Classification Search
None
See application file for complete search history.

(56) References Cited

U.S. PATENT DOCUMENTS

| | | |
|---|---|---|
| 8,983,849 B2 | 3/2015 | Phillips et al. |
| 9,093,069 B2 | 7/2015 | Lee et al. |
| 2003/0224804 A1* | 12/2003 | Liu ............ H04W 60/00 455/456.1 |
| 2012/0239291 A1 | 9/2012 | Do |

(Continued)

FOREIGN PATENT DOCUMENTS

EP    2677484 A1    12/2013

OTHER PUBLICATIONS

Liu, T. et al., *Mobility Modeling, Location Tracking, and Trajectory Prediction in Wireless ATM Networks*, IEEE Journal on Selected Areas in Communications, vol. 16, No. 6 (Aug. 1998) 922-936.

(Continued)

*Primary Examiner* — Alan Chen
(74) *Attorney, Agent, or Firm* — Alston & Bird LLP

(57) ABSTRACT

Methods are provided for modeling mobility based on one or more devices of the user. Methods may include: receiving at least a portion of a first mobility model from a first device, where the first mobility model may be established based on learning algorithms performed on the first device; updating a shared mobility model to become a first shared mobility model based on the at least a portion of the first mobility model; providing the first shared mobility model to the first device; receiving at least a portion of a second mobility model from a second device, where the second mobility model may be established based on learning algorithms performed on the second device; updating the first shared mobility model to become a second shared mobility model based on the at least a portion of the second mobility model; and providing the second shared mobility model to the second device.

20 Claims, 3 Drawing Sheets

(56) References Cited

U.S. PATENT DOCUMENTS

| | | |
|---|---|---|
| 2013/0304677 A1 | 11/2013 | Gupta et al. |
| 2014/0100835 A1* | 4/2014 | Majumdar ............ G06Q 10/047 |
| | | 703/11 |
| 2015/0242760 A1 | 8/2015 | Miao et al. |
| 2015/0314454 A1 | 11/2015 | Breazeal et al. |
| 2016/0275545 A1* | 9/2016 | Dasdan .............. G06Q 30/0244 |
| 2017/0195854 A1* | 7/2017 | Shi-Nash ............. H04W 4/029 |

OTHER PUBLICATIONS

Extended European Search Report for European Patent Application No. 16203035.7 dated Mar. 2, 2017, 9 pages.

* cited by examiner

METHOD, APPARATUS AND COMPUTER PROGRAM PRODUCT FOR COLLABORATIVE MOBILITY MAPPING

TECHNOLOGICAL FIELD

Example embodiments of the present invention relate generally to methods for collaboratively modeling the mobility of a plurality of devices, and more particularly, to a method, apparatus, and computer program product for collaboratively modeling the mobility of a plurality of devices through cloud synchronization to reconcile mobility patterns among the plurality of devices.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become more capable of performing tasks that far exceed a traditional voice call. Mobile devices are becoming portable computing devices that are capable of running a variety of applications and presenting a variety of types of information to a user. Further, many mobile devices incorporate some degree of location awareness that can be used to model a pattern of movement of the device, and accordingly a user thereof, to enhance services and information that may be provided to the user via the device.

SUMMARY

In general, an example embodiment of the present invention provides an improved method for modeling mobility of one or more devices. In particular, the method of example embodiments may include: receiving at least a portion of a first mobility model from a first device, where the first mobility model may be established based on learning algorithms performed on the first device; updating a shared mobility model to become a first shared mobility model based on the at least a portion of the first mobility model; and providing the first shared mobility model to the first device. Methods may further include: receiving at least a portion of a second mobility model from a second device, where the second mobility model may be established based on learning algorithms performed on the second device; updating the first shared mobility model to become a second shared mobility model based on the at least a portion of the second mobility model; and providing the second shared mobility model to the second device. The at least a portion of the first mobility model may be determined based on portions of the first mobility model that have been changed since last receipt of a prior shared mobility model.

According to some embodiments, updating a shared mobility model based on the at least a portion of the first mobility model may include comparing the at least a portion of the first mobility model with a respective portion of the shared mobility model, and updating the shared mobility model in response to a confidence score of the at least a portion of the first mobility model being greater than a confidence score of the respective portion of the shared mobility model. The confidence score of the at least a portion of the first mobility model may be calculated based on at least one of: an amount of data used to infer at least one location or at least one route of the at least a portion of the first mobility model; an accuracy of data points of at least one location, at least one transition, or along at least one route of the at least a portion of the first mobility model; an amount of time spent proximate at least one location; or an age of data points of at least one location, at least one transition, or along at least one route of the at least a portion of the first mobility model.

Embodiments may include wherein at least a portion of the first mobility model includes one or more transitions and a time table matrix, where a time of the one or more transitions and a day of the week of the one or more transitions may be used to update a time table matrix of the shared mobility model. The at least one transition may include a route between a first location and a second location, where the route includes one or more of: mode of transport data; shape of route data; confidence score data; or time along route data. Updating a shared mobility model based on the at least a portion of the first mobility model and the at least a portion of a second mobility model may include merging the at least a portion of the first mobility model and the at least a portion of the second mobility model with the shared mobility model to generate the second shared mobility model.

Embodiments of the present invention may provide an apparatus including at least one processor and at least one memory including computer program code. The at least one memory and the computer program code may be configured to, with the at least one processor, cause the apparatus to: receive at least a portion of a first mobility model from a first device, where the first mobility model may be established based on learning algorithms performed on the first device; update a shared mobility model to become a first shared mobility model based on the at least a portion of the first mobility model; and provide the first shared mobility model to the first device. The apparatus may also be caused to: receive at least a portion of a second mobility model from a second device, where the second mobility model is established based on learning algorithms performed on the second device; update the first shared mobility model to become a second shared mobility model based on the at least a portion of the second mobility model; and provide the second shared mobility model to the second device. The at least a portion of the first mobility model may be determined based on portions of the first mobility model that have been changed since last receipt of a prior shared mobility model.

According to some embodiments, causing the apparatus to update a shared mobility model based on the at least a portion of the first mobility model may include causing the apparatus to compare the at least a portion of the first mobility model with a respective portion of the shared mobility model, and update the shared mobility model in response to a confidence score of the at least a portion of the first mobility model being greater than a confidence score of a respective portion of the shared mobility model. The confidence score of the at least a portion of the first mobility model may be calculated based on at least one of: an amount of data used to infer at least one location or at least one route of the at least a portion of the first model; an accuracy of data points of at least one location, at least one transition, or along at least one route of the at least a portion of the first mobility model; an amount of time spent proximate at least one location; or an age of data points of the at least one location, at least one transition, or along at least one route of the at least a portion of the first mobility model.

An apparatus of example embodiments may include wherein the at least a portion of the first mobility model may include one or more transitions and a time table matrix, where a time of the one or more transitions and a day of the week of the one or more transitions may be used to update a time table matrix of the shared mobility model. The at least one transition may include a route between a first location and a second location, where the route includes one or more of: mode of transport data; shape of route data; confidence score data; or time along route data. Causing the apparatus to update a shared mobility model based on the at least a portion of the first mobility model and the at least a portion of the second mobility model may include causing the apparatus to merge the at least a portion of the first mobility model ant the at least a portion of the second mobility model with the shared mobility model to generate the second shared mobility model.

Embodiments of the present invention may provide a computer program product including at least one non-transitory computer-readable storage medium having computer-executable program code instructions stored therein. The computer-executable program code instructions may include: program code instructions for receiving at least a portion of a first mobility model from a first device, where the first mobility model may be established based on learning algorithms performed on the first device; program code instructions for updating a shared mobility model to become a first shared mobility model based on the at least a portion of the first mobility model; and program code instructions for providing the first shared mobility model to the first device. Computer program products of the present invention may include: program code instructions for receiving at least a portion of a second mobility model from a second device, where the second mobility model is established based on learning algorithms performed on the second device; program code instructions for updating the first shared mobility model to become a second shared mobility model based on the at least a portion of the second mobility model; and program code instructions for providing the second shared mobility model to the second device. The at least a portion of the first mobility model may be determined based on portions of the first mobility model that have been changed since last receipt of a prior shared mobility model;

According to some embodiments, the program code instructions for updating a shared mobility model based on the at least a portion of the first mobility model may include: program code instructions for comparing the at least a portion of the first mobility model with a respective portion of the shared mobility mode; and program code instructions for updating the shared mobility model in response to a confidence score of the at least a portion of the first mobility model being greater than a confidence score of the respective portion of the shared mobility model. The confidence score of the at least a portion of the first mobility model may be calculated based on at least one of: an amount of data used to infer at least one location, at least one transition, or at least one route of the at least a portion of the first mobility model; an accuracy of data points of at least one location, at least one transition, or along at least one route of the at least a portion of the first mobility model; an amount of time spent proximate at least one location; or an age of data points of at least one location, at least one transition, or along at least one route of the at least a portion of the first mobility model.

Embodiments may include where the at least a portion of the first mobility model includes one or more transitions and a time table matrix, where a time of the one or more transitions and a day of the week of the one or more transitions may be used to update the time table matrix of the shared mobility model. The program code instructions for updating a shared mobility model based on the at least a portion of the first mobility model and the at least a portion of a second mobility model may include program code instructions for merging the at least a portion of the first mobility model and the at least a portion of the second mobility model with the shared mobility model to generate the updated shared mobility model.

Embodiments of the present invention may provide an apparatus, where the apparatus may include: means for receiving at least a portion of a first mobility model from a first device, where the first mobility model may be established based on learning algorithms performed on the first device; means for updating a shared mobility model to become a first shared mobility model based on the at least a portion of the first mobility model; and means for providing the first shared mobility model to the first device. The apparatus of example embodiments may further include: means for receiving at least a portion of a second mobility model from a second device, where the second mobility model may be established based on learning algorithms performed on the second device; means for updating the first shared mobility model to become a second shared mobility model based on the at least a portion of the second mobility model; and means for providing the second shared mobility model to the second device. The at least a portion of the first mobility model may be determined based on portions of the first mobility model that have been changed since last receipt of a prior shared mobility model.

According to some embodiments, the means for updating a shared mobility model based on the at least a portion of the first mobility model may include means for comparing the at least a portion of the first mobility model with a respective portion of the shared mobility model, and means for updating the shared mobility model in response to a confidence score of the at least a portion of the first mobility model being greater than a confidence score of the respective portion of the shared mobility model. The confidence score of the at least a portion of the first mobility model may be calculated based on at least one of: an amount of data used to infer at least one location or at least one route of the at least a portion of the first mobility model; an accuracy of data points of at least one location, at least one transition, or along at least one route of the at least a portion of the first mobility model; an amount of time spent proximate at least one location; or an age of data points of at least one location, at least one transition, or along at least one route of the at least a portion of the first mobility model.

Embodiments may include wherein at least a portion of the first mobility model includes one or more transitions and a time table matrix, where a time of the one or more transitions and a day of the week of the one or more transitions may be used to update a time table matrix of the shared mobility model. The at least one transition may include a route between a first location and a second location, where the route includes one or more of: mode of transport data; shape of route data; confidence score data; or time along route data. The means for updating a shared mobility model based on the at least a portion of the first mobility model and the at least a portion of a second mobility model may include means for merging the at least a portion of the first mobility model and the at least a portion of the second mobility model with the shared mobility model to generate the second shared mobility model.

BRIEF DESCRIPTION OF THE DRAWINGS

Figure 1:
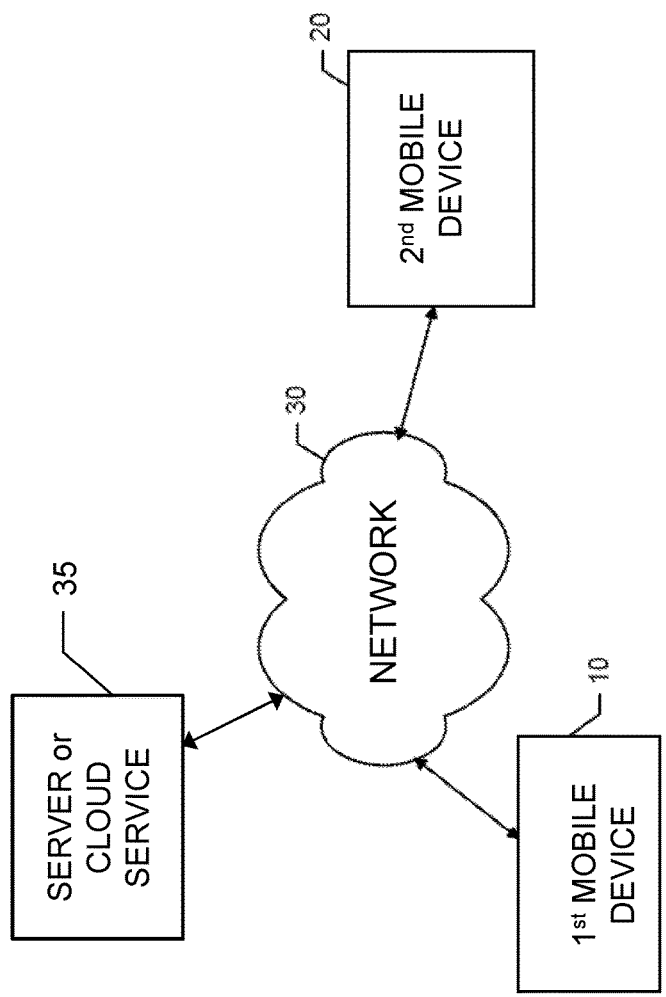
Figure 2:
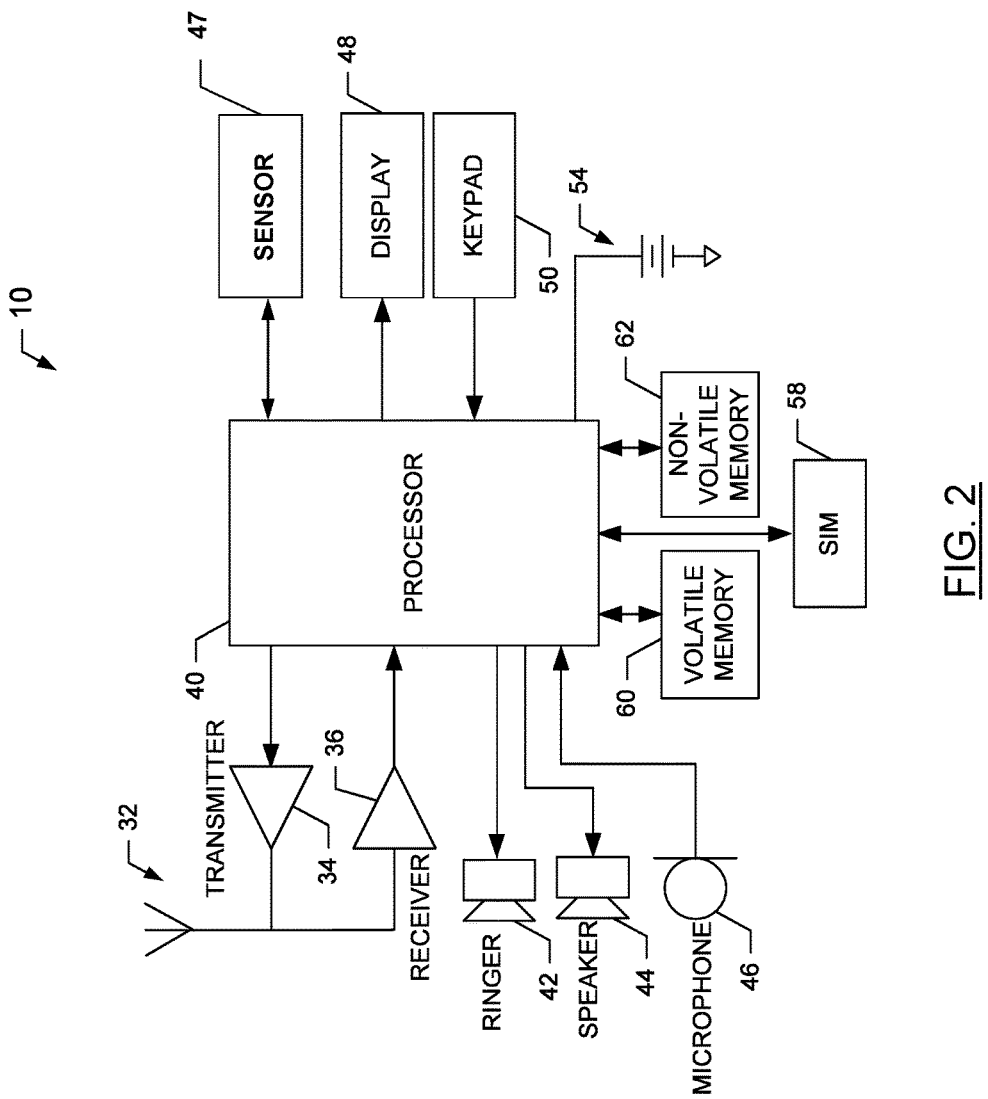
Figure 3:
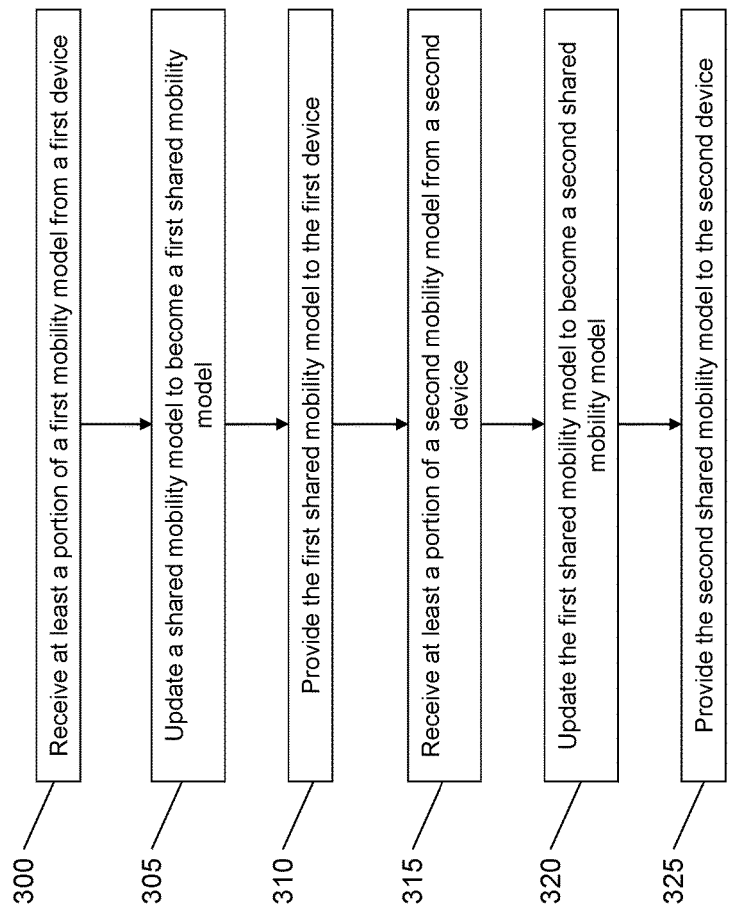

Having thus described certain example embodiments of the invention in general terms, reference will now be made to the accompanying drawings, which are not necessarily drawn to scale, and wherein:

FIG. 1 illustrates a communication system that may be configured in accordance with an example embodiment of the present invention;

FIG. 2 is a schematic block diagram of a mobile device that may be configured according to an example embodiment of the present invention; and FIG. 3 is a flowchart of a method of modeling mobility of a user of a plurality of devices according to an example embodiment of the present invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Embodiments of the present invention may provide an improved method of modeling the mobility of a user on a mobile device, and using the mobility model of that device to update a collaborative mobility model that may be shared with multiple mobile devices. These devices may be embodied by various mobile terminals, such as cell phones, tablet computers, laptop computers, smart watches, navigation systems (e.g., in-vehicle or portable), etc. These devices may be in communication with one another to share location information or to synchronize mobility models maintained among the various devices, as will be described further below. The communication between devices may be supported by a communication session, such as over a network or a cloud service.

A session may be supported by a network 30 as shown in FIG. 1 that may include a collection of various different devices that may be in communication with each other via corresponding wired and/or wireless interfaces or in ad-hoc networks such as those functioning over Bluetooth® interfaces. FIG. 1 should be understood to be an example of a broad view of certain elements of a system that may incorporate example embodiments of the present invention and not an all-inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols, near-field communication protocols (e.g. WiFi, Zigbee, Bluetooth™, etc.) and/or the like.

One or more communication terminals, such as the first mobile device 10 and the second mobile device 20, may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like), such as server 35 may be coupled to the first mobile device 10 and the second mobile device 20 via the network 30. By directly or indirectly connecting the first mobile device 10 and the second mobile device 20 and other devices to the network 30, the first mobile device 10 and the second mobile device 20 may be enabled to communicate with the other devices or each other, for example, according to numerous communication protocols including Hypertext Transfer Protocol (HTTP) and/or the like, to thereby carry out various communication or other functions of the first mobile device 10 and the second mobile device 20, respectively.

In example embodiments, either of the mobile terminals may be mobile or fixed communication devices. Thus, for example, the first mobile device 10 and the second mobile device 20 could be, or be substituted by, any of personal computers (PCs), personal digital assistants (PDAs), wireless telephones, desktop computers, laptop computers, mobile computers, cameras, video recorders, audio/video players, positioning devices, game devices, television devices, radio devices, or various other devices or combinations thereof.

The server 30 or cloud service may be embodied by another mobile device, a home-based network server, a third party application server, an internet service provider server, or the like. The function of the server, as will be described further below, is to generate the mobility models through the learned data of the mobile devices and to cascade or share the mobility models with the mobile devices. As such, the server 30 may be any device comprising the processing capabilities and the communication abilities to accomplish these tasks.

Although the first mobile device 10 may be configured in various manners, one example of a mobile device that could benefit from an example embodiment of the invention is depicted in the block diagram of FIG. 2. While several embodiments of the mobile device may be illustrated and hereinafter described for purposes of example, other types of mobile device, such as portable digital assistants (PDAs), pagers, mobile televisions, gaming devices, all types of computers (e.g., laptops, tablet computers, or mobile computers), cameras, audio/video players, radio, global positioning system (GPS) devices, or any combination of the aforementioned, and other types of communication devices, may employ example embodiments of the present invention. Further, the server 30 may be embodied by an apparatus as illustrated in FIG. 2 without deviating from the scope of the invention. As described, the mobile device may include various means for performing one or more functions in accordance with an example embodiment of the present invention, including those more particularly shown and described herein. It should be understood, however, that a mobile terminal may include alternative means for performing one or more like functions, without departing from the spirit and scope of the present invention.

The first mobile device 10 illustrated in FIG. 2 may include an antenna 32 (or multiple antennas) in operable communication with a transmitter 34 and a receiver 36. The mobile device may further include an apparatus, including at least one processor 40 and at least one memory. Among other functions, the processor provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile device may be capable of operating with one or more air interface standards, communication protocols, modulation types, and access types. By way of illustration, the mobile device may be capable of operating in accordance with any of a number of first, second, third and/or fourth-generation communication protocols or the like. For example, the mobile terminal may be capable of operating in accordance with second-generation (2G) wireless communication protocols IS-136, GSM (Global System for Mobile Communications) and IS-95, or with third-generation (3G) wireless communication protocols, such as UMTS (Universal Mobile Telecommunications System), CDMA (Code Division Multiple Access) 2000, wideband CDMA (WCDMA) and time division-synchronous CDMA (TD-SCDMA), with 3.9G wireless communication protocols such as E-UTRAN (evolved-UMTS (Universal Mobile Telecommunications System) terrestrial radio access network), with fourth-generation (4G) wireless communication protocols or the like.

It is understood that an apparatus implementing various aspects of the present invention, such as an apparatus including processor 40, may include circuitry implementing, among others, audio and logic functions of the mobile device 10. The processor 40 may be embodied in a number of different ways. For example, the processor 40 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 40 may include one or more processing cores configured to perform independently. A multi-core processor may enable multiprocessing within a single physical package. Additionally or alternatively, the processor 40 may include one or more processors configured in tandem via the bus to enable independent execution of instructions, pipelining and/or multithreading.

In an example embodiment, the processor 40 may be configured to execute instructions stored in the memory device 62 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to embodiments of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal) adapted for employing embodiments of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The mobile device 10 may also comprise a user interface including an output device such as an earphone or speaker 44, a ringer 42, a microphone 46, a display 48, and a user input interface, which may be coupled to the processor 40. The mobile device 10 may further include sensor(s) 47 for detecting a stimulus such as a button for detecting a depression, a touch sensitive display for detecting a touch, a light sensor for detecting light levels, a proximity sensor to detect an input without requiring a touch, a pressure sensor to detect barometric pressure, a temperature sensor to detect ambient temperature, or a motion sensor to detect motion, etc. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output.

The mobile terminal 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, e.g., cell id identity or cell id information, with which the mobile terminal is in communication.

Various applications and functions of a mobile device (e.g., mobile device 10 or 20) may benefit from an accurate mobility model that represents routine movements and locations of a user of a device during a day, week, month, etc. Provided herein is a method to build and develop a model of the mobility habits or patterns of a user of one or more mobile devices. A mobility model may be generated and updated by using learned data on a single mobile device. However, users may have several mobile devices that are used at different times and in different locations throughout a user's routine, such that a mobility model from a single device may be incomplete or may not fully represent the mobility habits and patterns of a user. The mobility model created according to methods described herein address this complexity to use the multitude of information from the various devices of a user to construct the most accurate and reliable mobility model possible. While learned mobility models may be implemented on a single mobile device, collaborative learning of mobility models among multiple mobile devices as provided herein may provide more accurate and complete mobility models of a user.

According to embodiments described herein, each mobile device may include a full replica of the mobility model (e.g., stored in memory 60 or 62) that is created and updated according to the learning methods below, and the replicas of the derived mobility model may be synchronized (e.g., shared) and updated through network connectivity sessions with the server 30. While each mobile device belonging to a user may include a mobility model, each mobility model may differ from the other mobility models due to unique uses of each mobile device by a user. In collaboration, each user device (e.g. mobile device 10 or 20) may contribute one or more portions of their respective mobility model and can contribute to the learning of user behavior that is modeled in the combined, collaborative mobility model that is shared with other mobile devices of the user. Each mobile device operating in accordance with methods described herein may build and refine its own version of a user's mobility model based on the most reliable data available, as determined through methods described below. Further, the mobility model described herein may be based on aggregate nature of a user (e.g., the cumulative movements of a user over a period of time) and may not contain explicit data regarding the past trajectory of a user in order to maintain a degree of privacy. The mobility models described herein may be used for departure prediction, destination prediction, route prediction, and the like, as will be described further below.

The mobility model of each mobile device of example embodiments may learn, via processor 40, user places or locations, transitions between places or locations, and typical routes for transitions with corresponding time pattern. The locations may be determined by various means, such as sensor 47, which may include a GPS sensor/receiver, or by receiver 35 which may use WiFi or 3G signals to determine location. By using learned data, the mobility models may provide an application program interface for location prediction with relevant or associated routes. To enhance the mobility model of each device, the learned data from multiple mobile devices may be merged at server 30 and shared with other user devices (e.g. $2^{nd}$ mobile device 20) to create the most accurate mobility model possible. Independent, local learning engines may run on each mobile device belonging to a user and synchronization may involve only the inferred, aggregate mobility model of each mobile device, such that raw location data is not shared through a network or cloud during synchronization. The synchronization service, which may be executed through server 30 or cloud service may be capable of reconciling independently-learned amendments and changes to the mobility model from each device, and select the best (e.g., most reliable) updates to create a common, accurate mobility model, which may then be shared with all devices. Each device may perform model learning/refinement independently between synchronization events (e.g., while a device is offline or not in communication with other user devices). Each mobility model on each device may include a plurality of places, transitions, and routes, while the synchronization process may then determine the most accurate places, transitions, and routes from among the mobility models of multiple devices to establish a more accurate and complete composite mobility model that may then be shared among the multiple devices.

As noted above, a plurality of mobile devices (e.g., mobile devices 10 and 20) may be associated with a user. Some of these mobile devices may be shared among multiple users; however, each device may each be aware of the specific user with which they are associated at any given time. For example, a vehicle that is shared between a couple or family may include a navigation system. That vehicle may be used by each member of the couple or family individually or as a group. The vehicle navigation system may be aware of the user in the vehicle during transitions between places or locations in the car. The user awareness of the vehicle may be established, for example, by the detection of a personal mobile device (e.g., a mobile phone, smart phone, smart watch, etc.) within the confines of the passenger compartment of the vehicle. The navigation system of the vehicle may maintain separate mobility models for each individual user of the vehicle, and vehicle trips involving one or more of the users may be used by the local model learning of the navigation system to update the mobility models for each of the one or more users present for the vehicle trip.

Each of the plurality of mobile devices associated with a user (whether associated with more than one user or not), may implement a mobility model learning engine. The model may be made of three primary components: places, transitions, and routes.

Places

Places or locations may include where the mobile device of the user spends time without substantial movement. Each mobile device of the user may learn such places based on the location capabilities of the device. The resulting place information may include: place or location coordinates, as estimated by the mobile device; coordinate accuracy; place name; and learning confidence score. The coordinate accuracy may be dependent upon the available accuracy on the learning device. For example, smartphones using WiFi positioning may be able to learn location with a relative accuracy of about 50 meters. Vehicles which may be connected to a network, such as a 3G or 4G LTE network, may establish location accuracy within about 500 meters. Devices with global positioning system (GPS) reception may learn location accuracy within about 20 meters or better. This accuracy can be variable for a device based upon the available locationing methods. For example, a device within a building may have a GPS antenna; however, the device may not be able to receive GPS signals within the building. However, WiFi may be enabled and the position of the device within the building may be established using WiFi, such that the accuracy of the location is based on the accuracy of the WiFi locationing method.

Transitions

Transitions are an ordered pair of places of a device, such that transitions occur between learned places of a mobile device. For example, a device may determine its location to be Place A, and later determine its location to be Place B, with no intervening locations or places in which the device dwelled for a substantial period of time (e.g., several minutes). The transition may be determined to be Place A-Place B, or an ordered pair of the places in which the device was dwelling for a particular amount of time. Transitions may be associated with a time of day, day of the week, month, and possibly year through a time table matrix. The transitions may be stored in the time table matrix where, for example, columns may represent days of the week, and rows may represent periods of the day (e.g., each hour of the day). The cells of such a matrix may be filled with a score representing a frequency of occurrence of a transition in the given day-of-week or period-of-day. For instance, the frequency may be calculated by: $\Sigma e^{-\alpha t_i}$, where $\alpha$ is a decay factor, and $t_i$ is the age of the i-th occurrence of the transition. As a transition becomes older, the occurrence of the transition may be afforded less weight as it may be considered less pertinent or reliable.

Routes

Routes are user movements between the places of a transition ordered pair. A route may be associated with a transition, and may include a route shape or geometry. A route may include waypoints that combine to define the route and the shape of the route.

Synchronization

While each mobile device associated with a user may maintain and update its own mobility model through learning, collaboration between mobile devices may produce a mobility model informed by the learned data gathered by each mobile device associated with the user. In order to do this, a synchronization of mobility models may occur. Synchronization of the devices associated with a user may be performed through network communication via any available network, and/or performed via a cloud service in a local network environment or a wide area network. The synchronization procedure may include uploading, by a respective device, the changes it has made to the mobility model since the last synchronization. Any places/locations or any transitions or times of transitions, or routes that may have changed within the mobility model may be uploaded to, for example, the cloud service. A server may merge the received changes with the previously established mobility model. If the server-side version (e.g., the shared version) of the model has also changed since the last synchronization with the uploading device, for example because other devices have reported changes in the interim, conflicting changes can occur. In the event of conflicting information, a resolution may be reached through a resolution algorithm that includes: the locations of places, transitions, and route shapes with the highest confidence scores may be kept; in the time table matrix, the cell with the maximum frequency may be kept, or with the cell with the most recent information; user edited content may be kept by default as it may be assumed to be accurate.

The server 30 may communicate changes (updates) of the mobility model to the uploading device (e.g., mobile devices 10 and 20). All model information that has changed on the server side since the last synchronization, including information that has just been merged with the mobility model, may be communicated to the device. The device may then overwrite the previously stored mobility model with the updated mobility model from the server, and the device may continue its own mobility model learning in anticipation of the next synchronization.

According to some embodiments, the server or cloud service may be a remote server such as a network provider, internet service provider, data center, or the like. As such, users may not wish to share detailed location information and historical traces of their movements with these remote services. The mobility model described herein can be generated, updated, and synchronized, without sharing detailed pin-point location of a user or an actual prior pattern of movement. Instead, the mobility model represents aggregate data and can generalize the movements and locations of a user without specifying the exact location of the user at any given time. In this way, some degree of privacy may be maintained by the user despite having an accurate mobility model describing historical, aggregate locations, transitions, and routes of the user.

As noted above, the mobility model is created based on places, transitions, and routes, together with time-related information. A place model may be established to define the information gathered at a place for incorporation into the mobility model. The place model may be described in a place Java Script Object Notation (JSON) scheme, where a place object may include the following fields. Similarly, transition models and route models may also be described in a JSON scheme for incorporation into the mobility model and for communicating updates/changes to a shared mobility model based on learned data. For example, the place object as stored in the mobility model may include a unique identifier to distinguish the place from other places, a name of the place, which may be a given name for a point-of-interest (POI), a retail establishment, a restaurant, etc., or the place name may be provided by a user, such as a place that is of particular interest to the user (e.g., office location). Other fields may include metadata about the place, such as if the place object is marked for deletion in the model (e.g., if it is no longer relevant or visited), a creation time (e.g., the first time the place is visited), the place location, and the user's familiarity with the place (e.g., the frequency of visiting the place). Further detail regarding the place object fields is provided below.

| Place | | |
|---|---|---|
| Field name | Type | Description |
| Id | String | Unique identifier generated by server |

-continued

| | Place | |
|---|---|---|
| Field name | Type | Description |
| name | Object, ref to Name | The place's name |
| markedAsDeleted | Boolean | Specifies if object is deleted or not |
| onDeviceCreatedTime | Integer | Specifies UNIX UTC timestamp when place was created on device |
| crossReference | Object, ref to crossReference | Specifies associated favorite Id stored in another (or same) cloud |
| position | Object, ref to Position | Position and its state |
| familiarity | Object, ref to Familiarity | User's familiarity of the place |

The name field may include a value (e.g., the actual name of the place), a timestamp of the last visit to the place, and a notation of whether the place was edited or modified by the user.

| | Name | |
|---|---|---|
| Field name | Type | Description |
| Value | String | The actual name of the place |
| editTimestamp | Integer | UNIX UTC timestamp of last modification |
| userEdited | Boolean | Whether the last edit was made by the user |

The cross-reference field may include a cross-reference to an identifier established by a user, for example. The cross-reference may denote a place that is established or marked by a user as a favorite location. Optionally, the cross-reference may link a place with a point-of-interest. If a user's location is established as coordinates proximate a point-of-interest, that point-of-interest may be cross-referenced in the place field information.

| | CrossReference | |
|---|---|---|
| Field name | Type | Description |
| Type | String | The type of object that is pointed at |
| Pointer | String | The identifier of the referenced object |
| editTimestamp | Integer | UNIX UTC timestamp of last modification |
| userEdited | Boolean | Whether the last edit was made by the user |

The position of the place may include geographic coordinates of the location, whether the location is user-edited, whether a user has manually altered or edited a timestamp, a confidence score of the coordinates (e.g., a radius of reliability), an averaged position (e.g., a large park location may be established by the average position of the user within the park), attractors, and an address. Attractors may include an example embodiment in which a mobile device of a user is within proximity to a particular point-of-interest or known location. The point-of-interest or known location may have an attractor region around it, such as a circle of a particular radius, or an irregular shape based on a geography around the location. A device located within the radius or irregularly shaped boundary around the location may be presumed to be at the location of the attractor.

| | Position | |
|---|---|---|
| Field name | Type | Description |
| coordinates | Pair of <Lat, Long> | Geo position of place |
| userEdited | boolean | True if user edited coordinates manually, false otherwise |
| editTimestamp | integer | User manual modification UNIX UTC timestamp |
| confidenceScore | Number | The confidence level in the estimated coordinates |
| averagedGeoPosition | Ref to AveragedGeoPosition | Current state of averaged learned coordinates filling into place radius |
| attractors | Array of <ref: MEC> | Array of attractors, where attractor is array of MECs |
| address | Ref to Address (SCBE sub-structure) | The reverse geo-coded position of the place |

Finally, the familiarity of the place may be based upon the last timestamp of a visit to the place, a familiarity score of the place, and a number of visits to the place. The familiarity score may be related to the number of visits, but may also be based on relative cadence of the visits and the duration of the visits.

| | Familiarity | |
|---|---|---|
| Field name | Type | Description |
| editTimestamp | Integer | UNIX UTC timestamp of last modification/calculation |
| score | Number | Familliarity score of the place |
| count | Integer | Count of visits to the place |

The merging of mobility models to establish the most recent, most accurate mobility models may be performed through merging logic at the server (e.g., server 30 using processor 40) which is responsible for merging updates of mobility models received from the various user devices with data on the server to create merged data in the form of a merged mobility model that is returned to the devices. The fields of each object within a mobility model may be divided into groups. When two versions of a particular object need to be merged, each group of fields may be merged separately. Therefore, the resulting merged object may be a mixture of the two original objects. However, within a group of fields, the values may either all be copied from the first object or all copied from the second object. In each group, three fields may be used to decide which of the mobility model objects the dominant, more accurate object is. Fields may include the "userEdited" flag, the "editTimestamp", and the "confidenceScore." A decision regarding the merge may be made based on an algorithm that determines:

If one version of the object is user edited, and the other is not, the user edited version becomes dominant to ensure that the user's preferences override the learned data because manual user input may be considered to be more precise and having the highest confidence score.

If both objects are user edited, the version with the most recent edit time may be deemed dominant.

If both objects are not user edited and no "confidenceScore" field is available for the group, then the object with the most recent timestamp may be deemed dominant.

If both objects are not user edited and a "confidenceScore" field is available, then the object with the highest current confidence level may be deemed dominant. The calculation of the confidence score will be detailed further below.

The object field of "markedAsDeleted" may be used by a processor at the server to define whether an object is deleted on the user device and deletion should be propagated to other devices. Merging logic as executed on a server by a processor may give priority to objects having "markedAsDeleted" set to true such that the object is established as obsolete and updating the object is not required.

The confidence score of objects may be time-dependent and may decrease with time. In order to implement such a property, confidence scores may be actualized to the current time before they can be compared. The confidence score may be determined via processor 40 using a clock, such as an internal processing clock, and stored together with the associated object in memory 62. The score found in the object field may be the score at the time of the last edit. Confidence scores may be actualized through the following equation:

$$score_{current} = score_{from\_field} - \alpha(time_{current} - time_{last\_update})$$

Where $\alpha$ is the decay rate, such as $1.9101 \times 10^{-7} [s^{-1}]$. In the case of familiarity fields of objects, which may exist in both place and route objects, a variation of the confidence score calculation may be used. The decay rate may be computed based on the number of times that the familiarity has been "reinforced," according to the following table:

| Count | Daily Decay Rate |
|---|---|
| 0-2 | 1.2e−07 |
| 3-19 | 1.9e−08 |
| 20-99 | 1.5e−08 |
| 100+ | 1.2e−08 |

And the familiarity scores may be actualized according to the following formula:

$$fscore_{current} = fscore_{from\_field} - rate(count_{lastupdate}) * (time_{current} - time_{last\_update})$$

Place merging may be performed based on rules for merging place objects at the server 30 using processor 40. The first rule may be to identify siblings (e.g., if the places are determined to be the same place), and the second rule may be to merge two versions of the siblings or same place object. In order to identify siblings, a place must first be established as a place object. A new place (e.g., without a unique identifier stored in memory 62) may be received and a look-up operation may be performed at the server to determine if a sibling exists (e.g., if the place has been visited before). The server may iterate over all place objects and call the algorithm below to find a matching place or sibling to merge with that may have been previously stored in memory 62. If no sibling place object is found, then a new place object is created (Place A).

```
Define: IsSiblingFound (Place A)
    for_each Place p in places:
        if p.coordinatesUserEdited = true AND
        A.coordinatesUserEdited = true
            if distance(p.coordinates, a.coordinates) < 100 meters
            then p is A sibling
        else if p.coordinatesUserEdited != A.coordinatesUserEdited
            if p.coordinatesUserEdited = true than a and P are
siblings if isAttracted(p.coordinates, A)
            else than A andpP are siblings if
            isAttracted(p, A.coordinates)
        else if p.coordinatesUserEdited = false AND
        A.coordinatesUserEdited = false
            then a and P are siblings if isAttracted(p, A) OR
            isAttracted(A, p)
```

Algorithm to check if Coordinate c is attracted by Place b:

```
Define isAttracted (Coordinates c, Place b)
    for_each Attractor a in b.Attractors:
        if distance(c, a.Center) < a.accuracy
            return true
    return false
```

Algorithm to check if Place a is attracted by Place b:

```
Define isAttracted (Place aPlace, Place bPlace)
    for_each Attractor b in bPlace.Attractors:
        for_each Attractor a in aPlace.Attractors:
            if distance(a.Center, b.Center) < max(a.Accuracy,
            b.Accuracy)
                return true
    return false
```

According to the algorithm above, which may be executed on server 30, assuming there are place objects A and B that need to be merged into place object C, there are four groups of fields in places: Name; crossReference; familiarity; and position. The "name" and "crossReference" have a user-edited tag and a timestamp edited flag. If both the name and cross reference are user edited not user edited, the version with the latest timestamp is deemed dominant. The familiarity contains a user familiarity score, the number of visits, and the last known update of the score. The higher last known update of the familiarity score will determine dominance. The position group contains all other data. The confidence score should be used to decide which version wins if none of the fields are user edited. Examples are provided below.

Example 1

Place A—{"name":{"value":"place1","userEdited":false, "editTimestamp":0}}

Place B—{"name":{"value":"place2","userEdited":true, "editTimestamp":1}}

Result—{"name":{"value":"place2","userEdited":true, "editTimestamp":1}}
Note: Take name field from Place B as it is the one user edited, while Place A was not user edited.

Example 2

Place A—{"name":{"value":"place1","userEdited":true, "editTimestamp":2}, "crossReference":{"type":"favoriteId","pointer":"id1","userEdited":false,"editTimestamp": 2},"position":{"userEdited":false,"coordinates":"coord1", "editTimestamp":0, "confidenceScore":1.2, <data1>}}
Place B—{"name":{"value":"place2","userEdited":true, "editTimestamp":1}, "crossReference":{"type":"favoriteId","pointer":"id2","userEdited":true,"editTimestamp": 1},"position":{"userEdited":true,"coordinates":"coord2", "editTimestamp":0, <data2>}}
Result—{"name":{"value":"place1","userEdited":true, "editTimestamp":2}, "crossReference":{"type":"favoriteId","pointer":"id2","userEdited":true,"editTimestamp": 1},"position":{"userEdited":true,"coordinates":"coord2", "editTimestamp":0, <data2>}}
Note: Take name field from Place A as in both places name has user input but in Place A is more recent, and take crossReference as in Place B is user edited while in Place A is assigned automatically. Finally, take position from B because it is user edited.

Example 3

Place A—{"name":{"value":"place1","userEdited":false, "editTimestamp":1}, "crossReference":{"type":"favoriteId","pointer":"id1","userEdited":false,"editTimestamp": 1},"position":{"userEdited":false,"coordinates":"coord1", "editTimestamp":0, "confidenceScore":1.2, <data1>}}
Place B—{"name":{"value":"place2","userEdited":false, "editTimestamp":0}, "crossReference":{"type":"favoriteId","pointer":"id2","userEdited":false,"editTimestamp": 0},"position":{"userEdited":false,"coordinates":"coord2", "editTimestamp":1000000", "confidenceScore":1.1, <data2>}}
Result—{"name":{"value":"place1","userEdited":false, "editTimestamp":0}, "crossReference":{"type":"favoriteId","pointer":"id1","userEdited":false,"editTimestamp": 0},"position":{"userEdited":false,"coordinates":"coord2", "editTimestamp":1000000, "confidenceScore":1.1, <data2>}}
Note: Place B's position has a slightly lower confidence score, but with a much more recent update timestamp. When place A's position confidence is adjusted to place B's update time, it becomes much lower (score=$1.2-1000000\alpha=0.2$). Therefore, place B's position wins.

While the above-described examples detail merging logic executed on a server or cloud service for places within a mobility model, similar merging logic may be implemented for transition merging and route merging. In transition merging logic, two transitions may be considered to be siblings if they have common start and end points. The information contained in transitions may include the timetable array of days of the week and periods (e.g. hours) of the days. The merging rule for timetable entries may be similar but slightly different from other objects. In an example, transition A and transition B need to be merged (e.g., they have common start and end places). If only one of the two transitions is user edited, the user-edited transition is deemed by the processor 40 to be the dominant transition and is used for the mobility model stored in memory 62. If both transitions are user edited, the transition with the most recent timestamp may be deemed dominant by the processor 40. If none of the transitions are user edited, each element of the timetable array may be merged separately according to a number of rules. The first rule may include that if transition A has a smaller edit timestamp than transition B, then all "core" values in the timetable of A are adjusted to the edit time of B according to the same formula as confidence scores (e.g., $\alpha(\text{edit\_ts}_B-\text{edit\_ts}_A)$ is subtracted from each entry). If it is the contrary, then scores are adjusted in B. A second rule may include that the merge timetable includes in the union of the entries of the two timetables (after adjusting the scores of the oldest one). If a (weekday, hour) pair appears on both sides, the maximum of the two scores may be kept. The update timestamp of the merged transition may then be the maximum (most recent) of the two edit timestamps.

Route merging logic may also be implemented by the server or cloud service 30 in generating a mobility model according to embodiments described herein. Two routes may be siblings if they share the same transition ID (e.g., same start and end points) and the geometry of the routes is similar. The similarity of routes is computed at the server 30 by processor 40 through the following analysis. For each waypoint of the first route, those that are within 50 meters (a value which may be user-defined or defined based on granularity of waypoint location) from the second route are marked. The fraction of the first route's length that is between marked waypoints may be referred to as the "matching length". The same calculation may be performed for the second route with respect to the first route. The ratio between the sum of the two route's matching length and the sum of the two routes total length may be calculated. For example, if the ratio is high, it suggests that the routes are closely matched. A threshold value may be set for route matching, such as a ratio of 0.9. If the ratio calculated by the method above is above 0.9, then the routes are determined to be "siblings." Route objects may include a single group of fields and may be merged according to the above-described user-edited/timestamp/confidence rules.

Synchronization between the various devices (e.g., mobile devices 10, 20) across the server (e.g., server 30) may be performed through various methods, such as over Hyper-Text Transfer Protocol Secure (HTTPS). In such an embodiment, a device may form a proper HTTP request with headers and a payload encoded in JSON and sent to the server. The server may then process the data and send back JSON payload with a corresponding HTTP response. Both the device and the server may support Gzip compression or some other form of compression to reduce the size of the payload exchanged. Standard HTTP status codes may be used in response to identify success or failure for the HTTP request.

The device may provide, via communication means such as transmitter 34, an HTTP request to provide an update to the server, such as server 30, for updating the mobility model stored at the server on a memory. According to such a request, a JSON payload may include field data which is an array of JSON objects, as described above. If an id is specified in the id field of the item body, then it should be considered as an update to the identified existing object. If an id is not specified, the object may be interpreted as a new addition to the mobility model. Only the updated fields for a JSON object need to be provided. As each device includes a mobility model from the prior synchronization, the device understands which fields of each object have changed according to the learned behavior of the device. As a request can include more than one object to be updated, the device may specify a reference ID to identify objects in the request and to receive responses. The reference ID can be used to specify objects, but is not considered part of the data scheme of the mobility model such that it may be ignored when updating the mobility map. The JSON payload of a request may include the last successful synchronization timestamp such that the server can include objects updated/created by other devices since the specified time. The value of the timestamp may be sent to the device in each successful request response. If the timestamp specified by the device is null, this may mean that the device has never been synchronized with the server and is requesting all server data regarding the mobility model to be sent.

An example embodiment of the request JSON scheme is outlined below.

```
{
    "data":{
        "type": "array",
        "description": "array of objects of place type",
        "items": {
            "type": "object",
            "properties": {
                "referenceId": {
                    "type": "integer"
                },
                "type": {
                    "type": "string",
                    "enum": ["place", "transition", "route"]
                }
                "obj_data": {
                    "oneOf": [
                        {"$ref":"place"},
                        {"$ref":"transition"},
                        {"$ref":"route"}
                    ]
                }
            }
        }
    },
    "count": {
        "type": "integer",
        "description": "number of objects"
    },
    "lastSynchronizationTimestamp":{
        "type": "integer",
        "default": 0,
        "description": "UNIX UTC Timestamp of last
        synchronization session with server
        to return updates starting at
        this time"
    },
    "clientData":
    {
        "description" : "Client data to be returned back from
        server in the response",
        "type" : "string"
    }
}
```

An example response JSON scheme may include:

```
{
    "data":{
        "type":"array",
        "description":"array of objects of place type",
        "items":{
            "type":"object",
            "properties":{
                "referenceId":{
                    "type":"integer"
                },
```

```
                "type": {
                    "type": "string",
                    "enum": ["place", "transition", "route"]
                }
                "obj_data": {
                    "oneOf": [
                        {"$ref":"place"},
                        {"$ref":"transition"},
                        {"$ref":"route"}
                    ]
                }
                "notFound":{
                    "type": "boolean",
                    "description": "should be set to true if
                    object has been deleted from servers - i.e. no
                    object with specified ID is found"
                }
            }
        }
    },
    "count": {
        "type":"integer",
        "description":"number of objects"
    },
    "synchronizationTimestamp":{
        "type":"integer",
        "description":"UNIX UTC Timestamp of last synchronization
        to be sent by client with next request",
        "required":"true"
    },
    "clientData":
    {
        "description" : "Client data to be returned back from server in
        the response",
        "type" : "string"
    }
}
```

In case of receiving update to existing object server detects that the id specified by the device doesn't exist, then the field "notFound" may be set to true to indicate that the object has been deleted by previous synchronizations. In such an event, the JSON data of the object can be skipped.

Below is an example of a first object that is an update as the id is specified. The second object is a new object:

```
{
    "data":[
    {
        "referenceId":1,
        "type":"place",
        "obj_data":{
            "id":"srv_id1",
            "markedAsDeleted":true
        }
    },
    {
        "referenceId":2,
        "type":"place",
        "obj_data":{
            "id":"",
            "onDeviceCreatedTime":123456
            <some more fields>
        }
    },
    {
        "referenceId":3,
        "type":"place",
        "obj_data":{
            "id":"srv_id3",
            "name":"place 1"
        }
    }],
```

-continued

```
        "count":3,
        "lastSynchronizationTimestamp":1234,
        "clientData":"some data"
}
```

A response JSON payload differs from request by server id of the second object and should contain only updated/merged fields for each object. The third object with Id srv_id3 was not found on the server, therefore in response "notFound" is set to true. Finally, a fourth object that has appeared on the server since the last synchronization may be sent to the device (without a referenceid because it is new to the device).

```
{
    "data":[
    {
        "referenceId":1,
        "type":"place",
        "obj_data":{
            "id":"srv_id1",
            "markedAsDeleted":false
        }
    },
    {
        "referenceId":2,
        "type":"place",
        "obj_data":{
            "id":"srv_id2",
            "onDeviceCreatedTime":123456
        }
    },
    {
        "referenceId":3,
        "type":"place",
        "notFound":"true",
    },
    {
        "type":"place",
        "obj_data":{
            "id":"srv_id4",
            "onDeviceCreatedTime":1400
        }
    }],
    "count":4,
    "synchronizationTimetamp":1234457,
    "clientData":"some data"
}
```

To delete all object from the server, for privacy reasons, there is an application program interface that allows the user to hard-delete all of the mobility model data. When the server receives a "DELETE" command, it should delete all objects, store the timestamp at which the data has been deleted into local persistent "lastDeleteTs" variable. When a new synchronization request comes from the same user, the following logic may apply. If "lastSynchronizationTimestamp" is smaller than "lastDeleteTs," then: all updates to objects that already have an id can be discarded immediately because their counterparts on the server no longer exist; and all new objects (without an id yet) are merged to the current server data as usual. Assume that lastDeleteTs=1000 on the server, and the following request is received at the server:

```
{
    "data":[
    {
        "referenceId":1,
        "type":"place",
```

```
        "obj_data":{
            "id":"srv_id1",
            <some more fields>
        }
    },
    {
        "referenceId":2,
        "type":"place",
        "obj_data":{
            "id": "",
            "onDeviceCreatedTime":1200,
            <some more fields>
        }
    }],
    "count":2,
    "lastSynchronizationTimestamp":600
}
```

The expected server response is the following:

```
{
    "data":[
    {
        "referenceId":2,
        "type":"place",
        "obj_data":{
            "id":"srv_id3"
        }
    },
    {
        "type":"place",
        "obj_data":{
            "id":"srv_id2",
            "onDeviceCreatedTime":1100,
            <some more fields>
        }
    }],
    "count":2,
    "fullDeleteHappened": true,
    "synchronizationTimetamp":1400
}
```

An application program interface may be used to check if a mobility model exists for a user. This may be useful to determine if a delete function, as described above, should be offered to the user. The application program interface should return the number of non-deleted objects present in the server. For example:

```
{
    "places":5,
    "transitions": 3,
    "routes": 4
}
```

Transition objects may contain references to the unique identifier of places, and rout objects containing references to the identifier of the transitions. These references need to be kept consistent. When new transition or route objects are created on a device, it may be the case that the referenced objects are also new and do not have a unique identifier yet. When uploading these new objects to the server, devices may overcome the problem by populating the fields of "startPlaceId", "endPlaceId", or "transitioned" with the "referenceId" of these objects. In this way, the server can replace the referenceIds with the newly assigned unique identifier. For example, if a client has two new places and a new transition to upload, the following may be used:

```
{
    "data":[
        {
            "referenceId":1,
            "type":"place",
            "obj_data":{
                <some data>
            }
        },
        {
            "referenceId":2,
            "type":"place",
            "obj_data":{
                <some data>
            }
        },
        {
            "referenceId":3,
            "type":"transition",
            "obj_data":{
                "startPlaceId": "ref:1",
                "endPlaceId": "ref:2",
                <some more fields>
            }
        }
    ],
    "count":3,
    "lastSynchronizationTimetamp":0
}
```

When responding, the server may replace the temporary references with newly assigned unique identifiers of the places:

```
{
    "data":[
        {
            "referenceId":1,
            "type":"place",
            "obj_data":{
                "id": "srv_id1"
            }
        },
        {
            "referenceId":2,
            "type":"place",
            "obj_data":{
                "id": "srv_id2"
            }
        },
        {
            "referenceId":3,
            "type":"transition",
            "obj_data":{
                "id": "srv_id3",
                "startPlaceId": "srv_id1",
                "endPlaceId": "srv_id2",
            }
        }
    ],
    "count":3,
    "synchronizationTimetamp":12345
}
```

Objects should not reference deleted objects. For example, a route object, if not deleted itself, should not indicate as "transitionId" the id of a deleted transition, or the id of a transition that has been removed from the server during a full deletion. Generally, devices may be responsible for cascading deletions. For example, if the user deletes a place object locally on a device, the device should also delete all objects that depend on this place and send all these deletions to the server upon the next synchronization. However, in some cases, the device may not be aware of all objects that depend on this particular place (e.g., if another device has created a transition between this place and another place since the last synchronization). Therefore, the server also needs to cascade deletions to dependent objects and notify the devices about them. Additionally, if the device uploads new objects that reference other objects that have been deleted in the meanwhile, the server should immediately mark them as deleted. For example, if a device sends the following:

```
{
    "data":[
        {
            "referenceId":1,
            "type":"transition",
            "obj_data":{
                "startPlaceId": "some_id_1",
                "endPlaceId": "some_id_2",
                <some more fields>
            }
        },
        {
            "referenceId":1,
            "type":"route",
            "obj_data":{
                "transitionId": "ref:1",
                <some more fields>
            }
        }
    ],
    "count":2,
    "lastSynchronizationTimetamp":1234
}
```

The place "some_id_1" may have been deleted by another device since the last synchronization, then the response may be:

```
{
    "data":[
        {
            "type":"place",
            "obj_data":{
                "id": "some_id_1",
                "markedAsDeleted": True
            }
        },
        {
            "referenceId":1,
            "type":"transition",
            "obj_data":{
                "markedAsDeleted": True
            }
        },
        {
            "referenceId":1,
            "type":"route",
            "obj_data":{
                "markedAsDeleted": True
            }
        }
    ],
    "count":3,
    "synchronizationTimetamp":3456
}
```

Similarly, as for "soft" deletion, if a device attempts to upload a new object that refers to an object that has been wiped from the server during a full deletion, then the server may mark the new object as deleted (and cascade this deletion). The device should receive a notification for all deleted objects. For example, if the device sends the following:

```
{
    "data":[
        {
            "type":"place",
            "obj_data":{
                "id": "some_id_1",
                "markedAsDeleted": True
            }
        },
        {
            "referenceId":1,
            "type":"transition",
            "obj_data":{
                "markedAsDeleted": True
            }
        },
        {
            "referenceId":1,
            "type":"route",
            "obj_data":{
                "markedAsDeleted": True
            }
        }
    ],
    "count":3,
    "synchronizationTimetamp":3456
}
```

If a full deletion has happened in between and the places "some_id_1" and "some_id"2" have been removed from the server, then the response may be:

```
{
    "data":[
        {
            "referenceId":1,
            "type":"transition",
            "obj_data":{
                "markedAsDeleted": True
            }
        },
        {
            "referenceId":1,
            "type":"route",
            "obj_data":{
                "markedAsDeleted": True
            }
        }
    ],
    "count":2,
    "synchronizationTimetamp":3456,
    "fullDeleteHappened": true
}
```

As described above, the merging of mobility models can be performed through the various steps of merging places, routes, and transitions. These merged models become the most recent, most relevant mobility models for a user, and are shared among all of the user devices to accurately describe a user's location and movements throughout a day, week, or month. This information may be beneficial to enable applications to predict locations and movements of a user in order to provide them with accurate and helpful information that may include traffic on routes, weather at locations, public transit schedules and delays, etc.

Further, it is appreciated that while location, transition, and route information may be recorded from a plurality of user devices, the user devices may not always be in active use by the user. For example, a user may have a tablet computer that they use at home in evenings and on weekends, and while out of the home on evenings and weekends, but the tablet computer may remain in the home while the user is at work during the work week. In such a case, the device may recognize a lack of activity on the device, and a lack of movement of the device, suggesting that the current place may not correspond to a user's place. This place information and time information may be determined to not be relevant to the mobility model since it does not accurately track the user. As such, only user places, transitions, and routes learned while the device is in use may contribute toward the mobility model.

FIG. 3 illustrates a flowchart of a method of modeling the mobility of a user of a plurality of devices according to an example embodiment of the present invention. An apparatus embodied by the a mobile terminal or a server, and more particularly, a processor, such as processor 40, may be configured to receive at least a portion of a first mobility model from a first device at 300. The first mobility model may be established and/or updated through learning algorithms performed on the first device. The mobility model may be a local copy stored on the first device. A shared mobility model may be updated to become a first shared mobility model at 305. The shared mobility model may be updated based on the received portion of the first mobility model from the first device. The first shared mobility model may be provided to the first device at 310. At least a portion of a second mobility model may be received from a second device at 315. The second mobility model may be established and/or updated at the second device through learning algorithms. The first shared mobility model may be updated to become a second shared mobility model at 320. The first shared mobility model may be updated with the at least a portion of the second mobility model received at 315. The second shared mobility model may be provided to the second device at 325.

As described above, FIG. 3 is a flowchart illustrating operations performed by or in relation to a server or mobile terminal of an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In an example embodiment, an apparatus for performing the methods of FIG. 3, described further below, may comprise a processor (e.g., the processor 40) configured to perform some or each of the operations (300-325) described below. The processor may, for example, be configured to perform the operations (300-325) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-325 may comprise, for example, the processor 40 and/or a device or circuit for executing instructions or executing an algorithm for processing information as described further below.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the tangible, non-transitory storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and associated drawings describe example embodiments in the context of certain example combinations of elements and/or functions, it should be appreciated that different combinations of elements and/or functions may be provided by alternative embodiments without departing from the spirit and scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving at least a portion of a first mobility model from a first device, wherein the first mobility model is established based on learning algorithms performed on the first device, wherein the first mobility model comprises a history of movements and locations of the first device;
updating a shared mobility model to become a first shared mobility model based on the at least a portion of the first mobility model;
providing the first shared mobility model to the first device;
receiving at least a portion of a second mobility model from a second device, wherein the second mobility model is established based on learning algorithms performed on the second device, wherein the second mobility model comprises a history of movements and locations of the second device;
updating the first shared mobility model to become a second shared mobility model based on the at least a portion of the second mobility model; and
providing the second shared mobility model to the second device.

2. The method of claim 1, wherein the at least a portion of the first mobility model is determined based on portions of the first mobility model that have been changed since last receipt of a prior shared mobility model.

3. The method of claim 1, wherein updating a shared mobility model based on the at least a portion of the first mobility model comprises:
comparing the at least a portion of the first mobility model with a respective portion of the shared mobility model, and updating the shared mobility model in response to a confidence score of the at least a portion of the first mobility model being greater than a confidence score of the respective portion of the shared mobility model.

4. The method of claim 3, wherein the confidence score of the at least a portion of the first mobility model is calculated based on at least one of:
an amount of data used to infer at least one location, at least one transition, or at least one route of the at least a portion of the first mobility model;
an accuracy of data points of at least one location, at least one transition, or along at least one route of the at least a portion of the first mobility model;
an amount of time spent proximate at least one location; or
an age of data points of at least one location, at least one transition, or along at least one route of the at least a portion of the first mobility model.

5. The method of claim 1, wherein the at least a portion of the first mobility model comprises one or more transitions and a time table matrix, wherein a time of the one or more transitions and a day of the week of the one or more transitions are used to update a time table matrix of the shared mobility model.

6. The method of claim 5, wherein the at least one transition comprises a route between a first location and a second location, wherein the route comprises one or more of:
mode of transport data;
shape of route data;
confidence score data; or
time along route data.

7. The method of claim 1, wherein updating a shared mobility model based on the at least a portion of the first mobility model and the at least a portion of a second mobility model comprises merging the at least a portion of the first mobility model and the at least a portion of the second mobility model with the shared mobility model to generate the second shared mobility model.

8. An apparatus comprising at least one processor and at least one memory including computer program code, the at least one memory and the computer program code configured to, with the at least one processor, cause the apparatus to at least perform:

receive at least a portion of a first mobility model from a first device, wherein the first mobility model is established based on learning algorithms performed on the first device, wherein the first mobility model comprises a history of movements and locations of the first device;

update a shared mobility model to become a first shared mobility model based on the at least a portion of the first mobility model;

provide the first shared mobility model to the first device;

receive at least a portion of a second mobility model from a second device, wherein the second mobility model is established based on learning algorithms performed on the second device, wherein the second mobility model comprises a history of movements and locations of the second device;

update the first shared mobility model to become a second shared mobility model based on the at least a portion of the second mobility model; and provide the second shared mobility model to the second device.

9. The apparatus of claim 8, wherein the at least a portion of the first mobility model is determined based on portions of the first mobility model that have been changed since last receipt of a prior shared mobility model.

10. The apparatus of claim 8, wherein causing the apparatus to update a shared mobility model based on the at least a portion of the first mobility model comprises causing the apparatus to:

compare the at least a portion of the first mobility model with a respective portion of the shared mobility model, and update the shared mobility model in response to a confidence score of the at least a portion of the first mobility model being greater than a confidence score of the respective portion of the shared mobility model.

11. The apparatus of claim 10, wherein the confidence score of the at least a portion of the first mobility model is calculated based on at least one of:

an amount of data used to infer at least one location, at least one transition, or at least one route of the at least a portion of the first mobility model;

an accuracy of data points of at least one location, at least one transition, or along at least one route of the at least a portion of the first mobility model;

an amount of time spent proximate at least one location; or an age of data points of at least one location, at least one transition, or along at least one route of the at least a portion of the first mobility model.

12. The apparatus of claim 8, wherein the at least a portion of the first mobility model comprises one or more transitions and a time table matrix, wherein a time of the one or more transitions and a day of the week of the one or more transitions are used to update a time table matrix of the shared mobility model.

13. The apparatus of claim 12, wherein the at least one transition comprises a route between a first location and a second location, wherein the route comprises one or more of:

mode of transport data;
shape of route data;
confidence score data; or
time along route data.

14. The apparatus of claim 8, wherein causing the apparatus to update a shared mobility model based on the at least a portion of the first mobility model and the at least a portion of a second mobility model comprises causing the apparatus to merge the at least a portion of the first mobility model and the at least a portion of the second mobility model with the shared mobility model to generate the second shared mobility model.

15. A computer program product comprising at least one non-transitory computer-readable storage medium having computer-executable program code instructions stored therein, the computer-executable program code instructions comprising:

program code instructions for receiving at least a portion of a first mobility model from a first device, wherein the first mobility model is established based on learning algorithms performed on the first device;

program code instructions for updating a shared mobility model to become a first shared mobility model based on the at least a portion of the first mobility model, wherein the first mobility model comprises a history of movements and locations of the first device;

program code instructions for providing the first shared mobility model to the first device;

program code instructions for receiving at least a portion of a second mobility model from a second device, wherein the second mobility model is established based on learning algorithms performed on the second device, wherein the second mobility model comprises a history of movements and locations of the second device;

program code instructions for updating the first shared mobility model to become a second shared mobility model based on the at least a portion of the second mobility model; and program code instructions for providing the second shared mobility model to the second device.

16. The computer program product of claim 15, wherein the program code instructions for updating a shared mobility model based on the at least a portion of the first mobility model comprises:

program code instructions for comparing the at least a portion of the first mobility model with a respective portion of the shared mobility model, and program code instructions for updating the shared mobility model in response to a confidence score of the at least a portion of the first mobility model being greater than a confidence score of the respective portion of the shared mobility model.

17. The computer program product of claim 16, wherein the confidence score of the at least a portion of the first mobility model is calculated based on at least one of:

an amount of data used to infer at least one location, at least one transition, or at least one route of the at least a portion of the first mobility model;

an accuracy of data points of at least one location, at least one transition, or along at least one route of the at least a portion of the first mobility model;

an amount of time spent proximate at least one location; or an age of data points of at least one location, at least one transition, or along at least one route of the at least a portion of the first mobility model.

18. The computer program product of claim 15, wherein the at least a portion of the first mobility model comprises one or more transitions and a time table matrix, wherein a time of the one or more transitions and a day of the week of the one or more transitions are used to update a time table matrix of the shared mobility model.

19. The computer program product of claim 15, wherein the program code instructions for updating a shared mobility model based on the at least a portion of the first mobility model and the at least a portion of a second mobility model comprises program code instructions for merging the at least a portion of the first mobility model and the at least a portion of the second mobility model with the shared mobility model to generate the updated shared mobility model.

20. The method of claim 1, wherein updating the first shared mobility model to become a second shared mobility model based on the at least a portion of the second mobility model comprises:
synchronizing the first shared mobility model with the second mobility model to become the second shared mobility model, wherein the second shared mobility model comprises a learned mobility model for a user of both the first device and the second device representing a history of movements and locations of the user.

* * * * *